United States Patent Office 3,154,539
Patented Oct. 27, 1964

3,154,539
PRODUCTION OF LACTAMS BY REARRANGEMENT OF CYCLIC KETOXIMES
Rudolf Irnich, Frankenthal, Pfalz, Germany, assignor to Badische Anilin- & Soda-Fabrik Aktiengesellschaft, Rheinland-Pfalz, Germany
No Drawing. Filed July 23, 1963, Ser. No. 296,911
Claims priority, application Germany July 25, 1962
6 Claims. (Cl. 260—239.3)

This invention relates to a new process for the production of lactams by catalytic rearrangement of cyclic ketoximes.

In the prior art methods for the production of lactams, cycloaliphatic ketoximes are rearranged in mineral acids, advantageously in concentrated sulfuric acid, to the lactams. Large amounts of sulfuric acid are required for this purpose and this, after the rearrangement, is usually neutralized with ammonia. Concentrated ammonium sulfate solutions are thus formed which are not easy to handle.

Methods have therefore been sought in which oximes could be rearranged in the gas phase in contact with solid catalysts. Such a process is described for example in British patent specification No. 881,276 according to which the oxime is vaporized prior to the rearrangement and passed in vapor phase over the rearrangement catalyst. Decomposition of the oxime to a greater or lesser extent always takes place in the vaporizer, however, particularly if the oxime has to be kept at elevated temperature for a long period. It is not possible to entirely avoid cracking of the oxime even when using falling film evaporators or when carrying out the evaporation at very low subatmospheric pressure. The decomposition products formed not only diminish the yield but also make the purification of the lactam difficult and worsen the quality of the lactam polymers. Moreover removal of heat liberated in the strongly exothermic rearrangement offers certain difficulties, particularly at high throughputs, even in a fluidized bed.

U.S. patent application Ser. No. 199,248, filed June 1, 1962, by Wolfgang Huber, Norbert Petri, Siegfried Schreiner and Karl Wintersberger relates to a process for the production of lactams by catalytic rearrangement of oximes of cyclic ketones in contact with acid catalysts which if desired may be applied to a carrier and which are maintained in fluidization, at elevated temperature, the oxime being supplied to the catalyst in liquid form.

It is an object of this invention to provide a process by which cyclic ketoximes may be rearranged into lactams without a large amount of mineral acid being necessary. It is another object of the invention to provide a process by which cyclic ketoximes are rearranged in contact with solid catalysts without the need for vaporizing the ketoximes outside the actual reaction zone. It is a further object of the invention to provide a process by which cyclic ketoximes are rearranged in contact with a fluidized solid catalyst and in which there is no difficulty in removing the heat of reaction. Further objects and advantages of the invention will be evident from the following description.

In accordance with this invention it has been found that the said objects and advantages are achieved and cyclic ketoximes can be catalytically rearranged into lactams just as advantageously as according to the process of copending application Ser. No. 199,248 by conveying the ketoxime in solid form by means of a current of inert gas into the zone containing the fluidized catalyst.

The modified process offers the same advantages over the state of the art as the process of the above-mentioned copending application. Decomposition of the oxime in a previous vaporization is avoided. The heat of reaction is utilized for melting and vaporizing the oxime. In this way energy is saved on the one hand and control of the temperature is facilitated during the rearrangement reaction on the other hand. A further advantage of the process according to the invention is that the catalyst and oxime may be supplied together through only one metering device. Hitherto supplying initial materials by means of a current of inert gas has actually been avoided because it is known from German printed application No. 1,055,537 that the coemployment of inert gas in the catalytic rearrangement of oximes leads to diminished yields. Surprisingly, however, the yields are better than those in the process according to British patent specification No. 881,276.

The process may be used for converting cycloalkanone oximes preferably containing from five to twelve carbon atoms, especially from 6 to 8 carbon atoms. Examples of suitable cycloalkanone oximes are cyclopentanone oxime, cyclohexanone oxime, methylcyclopentanone oxime, methylcyclohexanone oxime, cyclooctanone oxime and cyclododecanone oxime.

The following substances may be used with advantage as acid catalysts: phosphoric acid, boric acid or alkali metal hydrogen sulfates, for example lithium, sodium or potassium hydrogen sulfate or mixtures of these compounds.

The catalysts, if solid at the reaction temperature, may be used in the original form or they may be supported on carriers which are inert to the rearrangement process. Examples of suitable carriers include oxides of those elements of the 3rd and 4th groups of the periodic system which have an atomic weight of more than 25, for example oxides of aluminum, silicon, tin or titanium. Examples of these are the various forms of aluminum oxide, such as alumina, Bayerite and corundum; silica gel and diatomaceous earth; and tin dioxide and titanium dioxide. Pumice, active charcoal or zinc oxide may also be used as carriers.

The ratio of acid catalyst to its carrier may be varied to a comparatively wide extent. In general the ratio is between 1:100 and 1:0.25. With the preferred carrier-supported catalysts, the proportion of acid catalyst amounts to from 50 to 60% by weight of the combined catalyst and carrier.

The method adopted for the manufacture of these catalysts is well known. The catalyst and carrier are made into a paste with a little water, mixed in a mill and extruded as rods or pellets; the product is dried for some time, for example for twenty-four hours at 120° C., and then heated to a higher temperature, for example for six hours at from 400° to 800° C.

Pellets, cylinders, rods or another geometric shape is used. The catalyst particles have diameters of from 0.005 to 1.0 mm., or preferably of from 0.03 to 0.6 mm. The depth of the fluidized catalyst beds is preferably 20 to 70 cm.

The rearrangement is carried out at temperatures between 210° and 450° C., preferably between 280° and 400° C., in particular at about 360° C. and usually under atmospheric or subatmospheric pressure. Where the rearrangement is carried out under subatmospheric pressure, pressures ranging between 20 and 500 mm. Hg are preferred. The process may, however, also be carried out under superatmospheric pressure, for example at 2 or 5 atmospheres gauge or at even higher pressures.

In carrying out the process in accordance with this invention, the catalyst may be first heated to the reaction temperature and fluidized by means of a current of inert gas. Examples of suitable inert gases are argon, carbon dioxide and nitrogen. The ketoxime may then be introduced pneumatically in the form of small particles into the fluidized catalyst bed in the conventional way. It is advantageous to introduce the ketoxime at one or more points in the lower third of the catalyst bed. Generally from 2,000 to 3,000 liters of inert gas is required for each kilogram of ketoxime. The initial material and fresh or regenerated catalyst may be metered in together and conveyed into the catalyst zone. The heat liberated by the reaction is quite sufficient to bring about vaporization of the oxime. As a rule, therefore, no further heating of the catalyst is necessary; in fact it is often necessary to provide cooling to prevent overheating.

The vapors and gases emerging from the reaction chamber should be led through a cyclone in which any catalyst particles carried over may be separated out. The vapors may then be subjected to fractional cooling, for example in a first stage at 60° to 80° C., in which the bulk of the lactam condenses out, and then in a second stage at about 20° C. in which the residual lactam can be washed out, for example by a spray of water, and cooled. Uncondensed gases may be recycled to the fluidized bed.

The catalysts become exhausted after some time and then have to be regenerated, for example by heating in a current of air at 700° to 900° C. A regeneration period may therefore be introduced from time to time or the catalyst may be replaced continuously by fresh or regenerated material and an appropriate quantity of catalyst within the reaction zone may be allowed to overflow through an outlet located at a suitable height in the reactor, whereupon it may be subjected to a regeneration process carried out externally.

The new process produces a lactam which contains only very small quantities, i.e. less than 1% by weight, of oxime and byproducts such as nitriles. The product may readily be purified by the usual methods, for example by distillation under subatmospheric pressure, where necessary with the addition of oleum, followed by a treatment with potassium permanganate, filtration and a final distillation.

The invention is illustrated by the following examples.

*Example 1*

The apparatus used is a vertical electrically heated reactor 100 cm. in length and 10 cm. in diameter which is closed at the bottom by a coarse glass frit. 600 g. of fresh aluminum oxide/boron oxide catalyst having an aluminum oxide content of 60% by weight and 40% by weight of boron oxide in a grain size of 0.3 to 0.5 mm. is heated in the reactor and fluidized by a current of 1,400 l./h. of nitrogen which has been heated to 300° C. and which is blown in through the frit at the bottom of the reactor. When the catalyst bed has reached a temperature of 360° C., 1,128 g. of oxime having a water content of 4.8% by weight and 1,128 g. of catalyst are introduced within 185 minutes into the catalyst zone by means of 1,000 liters of nitrogen per hour using a supply pipe 40 cm. in length and 0.5 cm. in diameter which discharges into the reaction tube at an angle of 45° about 5 cm. above the glass frit. In order to keep the height of the catalyst bed constant, an amount of catalyst equivalent to the amount supplied is withdrawn from the catalyst zone by means of an overflow. The difference in height between the discharge end of the supply pipe and the overflow is about 20 cm. The end of the said supply pipe projects about 0.5 cm. into the reaction chamber. It is surrounded by a jacket pipe. 350 liters per hour of nitrogen is passed into the reaction chamber through the annular space between the supply pipe and the jacket pipe. In this way the supply pipe is cooled and melting of the oxime therein prevented.

The gaseous reaction mixture is passed through a cooler which is fed with water at 70° C. The condensate is distilled under subatmospheric pressure and from 1,074 g. of anhydrous oxime there is obtained 903 g. of caprolactam, equivalent to a yield of 84.1% of the theory.

*Example 2*

The procedure described in Example 1 is followed except that the initial charge of catalyst is 600 g. of used catalyst instead of 600 g. of fresh catalyst. 1,900 g. of oxime having a water content of 5.1% by weight and 915 g. of catalyst are passed into the reaction chamber within 195 minutes by means of 1,500 liters per hour of nitrogen. The further procedure of Example 1 is followed and 1,661 g. of caprolactam is obtained from 1,803 g. of anhydrous oxime, equivalent to 92.1% of the theory.

I claim:

1. In a process for the production of lactams by rearrangement of cyclic ketoximes in the presence of a fluidized acid catalyst at a temperature of from 210° to 450° C., the improvement which comprises introducing the ketoxime to be rearranged into the fluidized catalyst bed in the solid state by means of an inert gas stream.

2. An improved process as claimed in claim 1 wherein the reaction temperature is between 280° and 400° C.

3. An improved process as claimed in claim 1 wherein the reaction temperature is about 360° C.

4. An improved process as claimed in claim 1 wherein the cyclic ketoxime is a cycloalkanone having five to twelve carbon atoms.

5. An improved process as claimed in claim 1 wherein the cyclic ketoxime is cyclohexanone oxime.

6. An improved process as claimed in claim 1 wherein the inert gas is a member selected from the class consisting of nitrogen, carbon dioxide and argon.

No references cited.